(12) United States Patent
Zhang et al.

(10) Patent No.: US 10,159,068 B2
(45) Date of Patent: Dec. 18, 2018

(54) FTM PROTOCOL ENHANCEMENTS FOR CHANNEL DELAY SPREAD

(71) Applicant: QUALCOMM Incorporated, San Diego, CA (US)

(72) Inventors: Ning Zhang, Saratoga, CA (US); Xiaoxin Zhang, Sunnyvale, CA (US); Kai Shi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 15/466,167

(22) Filed: Mar. 22, 2017

(65) Prior Publication Data

US 2017/0280439 A1  Sep. 28, 2017

Related U.S. Application Data

(60) Provisional application No. 62/312,616, filed on Mar. 24, 2016.

(51) Int. Cl.
| | | |
|---|---|---|
| *H04W 72/04* | (2009.01) | |
| *H04L 5/00* | (2006.01) | |
| *H04W 24/02* | (2009.01) | |
| *H04L 27/26* | (2006.01) | |
| *H04L 25/02* | (2006.01) | |

(52) U.S. Cl.
CPC ....... *H04W 72/0413* (2013.01); *H04L 5/0007* (2013.01); *H04L 5/0055* (2013.01); *H04L 27/2607* (2013.01); *H04W 24/02* (2013.01); *H04L 25/0216* (2013.01)

(58) Field of Classification Search
None
See application file for complete search history.

(56) References Cited

U.S. PATENT DOCUMENTS

2007/0274203 A1* 11/2007 Kimura ............... H04L 27/2647
  370/208
2008/0310519 A1   12/2008 Seyedi-Esfahani et al.
2014/0192847 A1    7/2014 Afkhami et al.
(Continued)

OTHER PUBLICATIONS

International Search Report and Written Opinion—PCT/US2017/023742—ISA/EPO—dated Jun. 21, 2017.
(Continued)

*Primary Examiner* — Rebecca E Song
(74) *Attorney, Agent, or Firm* — Paradice and Li LLP/Qualcomm

(57) ABSTRACT

This disclosure provides systems, methods and apparatuses for selecting a guard interval for transmission of orthogonal frequency-division multiplexing (OFDM) symbols on an uplink (UL) channel and on a downlink (DL) channel. In some implementations, a transmitting device and a receiving device can estimate channel delay spread (CDS) information for each other's transmit channels, exchange the estimated CDS information with each other, and select a guard interval based on the estimated CDS information exchanged with each other. The transmitting device can transmit a number of OFDM symbols separated by the selected guard interval to the receiving device on the UL channel, and the receiving device can transmit a number of OFDM symbols separated by the selected guard interval to the transmitting device on the DL channel.

30 Claims, 10 Drawing Sheets

(56) References Cited

U.S. PATENT DOCUMENTS

| | | | |
|---|---|---|---|
| 2015/0049716 A1* | 2/2015 | Gutierrez | H04W 84/12 |
| | | | 370/329 |
| 2016/0044524 A1* | 2/2016 | Ben-Haim | G01S 5/14 |
| | | | 370/252 |
| 2016/0081054 A1 | 3/2016 | Zhang et al. | |
| 2016/0366548 A1* | 12/2016 | Wang | H04W 64/00 |

OTHER PUBLICATIONS

Zhang J., et al., "Closed-Loop Link Adaptation Technique for 16m System", C80216m-08_549r1, IEEE Draft, vol. 802.16m, No. r1, Jul. 8, 2008, XP017791533, [retrieved on Jul. 9, 2008], pp. 1-4.

* cited by examiner

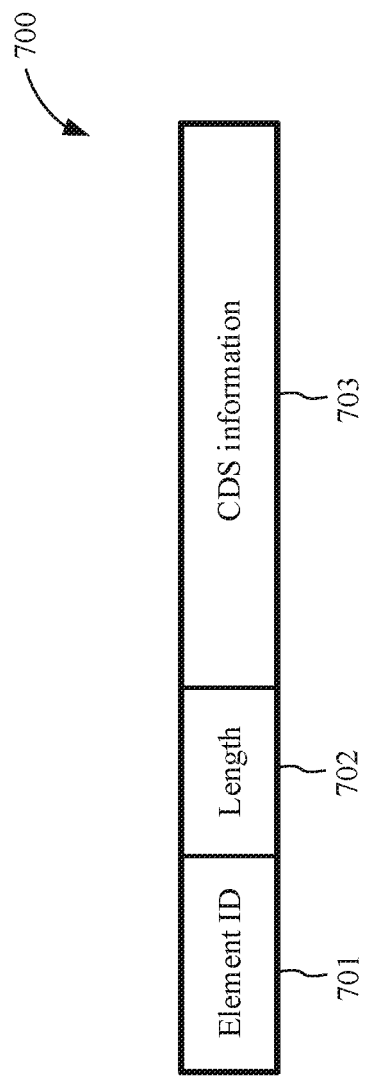

FTM PROTOCOL ENHANCEMENTS FOR CHANNEL DELAY SPREAD

CROSS-REFERENCE TO RELATED APPLICATION

This application claims the benefit of co-pending and commonly owned U.S. Provisional Patent Application No. 62/312,616 entitled "FTM PROTOCOL ENHANCEMENTS FOR CHANNEL DELAY SPREAD" filed on Mar. 24, 2016, the entirety of which is hereby incorporated by reference.

TECHNICAL FIELD

This disclosure relates generally to wireless networks, and specifically to selecting a guard interval for transmitting orthogonal frequency-division multiplexing (OFDM) symbols over a wireless channel.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), periodically broadcasts beacon frames to enable any STAs within wireless range of the AP to establish and maintain a communication link with the WLAN. In a typical WLAN, only one STA may use the wireless medium at any given time, and each STA may be associated with only one AP at a time.

In many WLANs, data packets are transmitted as orthogonal frequency-division multiplexing (OFDM) symbols. When a first wireless device transmits an OFDM symbol to a second wireless device, the width (or duration) of the OFDM symbol may increase because of delays associated with the transmit (TX) filter in the first wireless device, multipath effects associated with the wireless medium, and delays associated with the receive (RX) filter in the second wireless device.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless network to select a guard interval for transmission of orthogonal frequency-division multiplexing (OFDM) symbols on an uplink (UL) channel and on a downlink (DL) channel. A transmitting device and a receiving device can estimate channel delay spread (CDS) information for each other's transmit channels, exchange the estimated CDS information with each other, and select a guard interval based on the estimated CDS information provided by the other device. A ranging operation may be performed between the transmitting device and the receiving device. The transmitting device can estimate CDS information for the DL channel based on frames received from the receiving device on the DL channel, and the receiving device can estimate CDS information for the UL channel based on frames received from the transmitting device on the UL channel. The transmitting device can send the estimated CDS information for the DL channel to the receiving device, which can select a guard interval based on the estimated CDS information for the DL channel. Similarly, the receiving device can send the estimated CDS information for the UL channel to the transmitting device, which can select a guard interval based on the estimated CDS information for the UL channel.

Another innovative aspect of the subject matter described in this disclosure can be implemented as a method for selecting a guard interval for transmission of OFDM symbols on the UL channel. The method can include transmitting, to the receiving device on the UL channel, a fine timing measurement (FTM) request frame indicating the CDS capabilities of the transmitting device; receiving, from the receiving device on a downlink (DL) channel, a first FTM frame indicating CDS capabilities of the receiving device; estimating a CDS value of the DL channel based on the first FTM frame; transmitting, to the receiving device on the UL channel, a first acknowledgement (ACK) frame; receiving, from the receiving device on the DL channel, a second FTM frame indicating an estimated CDS value of the UL channel; and selecting a value for the guard interval based on the estimated CDS value of the UL channel. The method also can include transmitting, to the receiving device on the UL channel, a number of OFDM symbols separated by the selected guard interval. In some aspects, the method also can include transmitting, to the receiving device on the UL channel, an FTM feedback frame indicating the estimated CDS value of the DL channel.

The FTM request frame can include a vendor-specific information element (VSIE) indicating the CDS capabilities of the transmitting device. In some aspects, the VSIE of the FTM request frame can include a dedicated bit indicating whether the transmitting device is capable of estimating CDS information for the DL channel or whether the transmitting device is capable of transmitting an FTM feedback frame to the receiving device. The first FTM frame can include a VSIE indicating the CDS capabilities of the receiving device. In some aspects, the VSIE of the first FTM frame can include a dedicated bit indicating whether the receiving device is capable of estimating CDS information for the UL channel or whether the receiving device is to report estimated CDS information for the UL channel to the transmitting device.

In some implementations, the estimated CDS value of the UL channel can be included in a first of a time of arrival (TOA) field of the second FTM frame and a time of departure (TOD) field of the second FTM frame, and a time value indicating a difference between the TOD of the first FTM frame and the TOA of the first ACK frame is included in a second of the TOA field of the second FTM frame and the TOD field of the second FTM frame. In other implementations, the estimated CDS value of the UL channel can be included in a TOA error field or a TOD error field of the second FTM frame.

Another innovative aspect of the subject matter described in this disclosure can be implemented as a method for selecting a guard interval for transmission of OFDM symbols on the DL channel. The method can include receiving, from a transmitting device on an uplink (UL) channel, a fine timing measurement (FTM) request frame indicating a number of channel delay spread (CDS) capabilities of the transmitting device; transmitting, to the transmitting device on the DL channel, a first FTM frame indicating CDS capabilities of the receiving device; receiving, from the transmitting device on the UL channel, a first acknowledgement (ACK) frame; estimating a CDS value of the UL channel based on the first ACK frame; transmitting, to the transmitting device on the DL channel, a second FTM frame indicating the estimated CDS value of the UL channel; receiving, from the transmitting device on the UL channel, an FTM feedback frame indicating an estimated CDS value of the DL channel; and selecting a value for the guard interval based on the estimated CDS value of the DL channel. The method also can include transmitting, to the transmitting device on the DL channel, a number of OFDM symbols separated by the selected guard interval.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 shows an example channel delay spread information element (IE).

DETAILED DESCRIPTION

Figure 1:
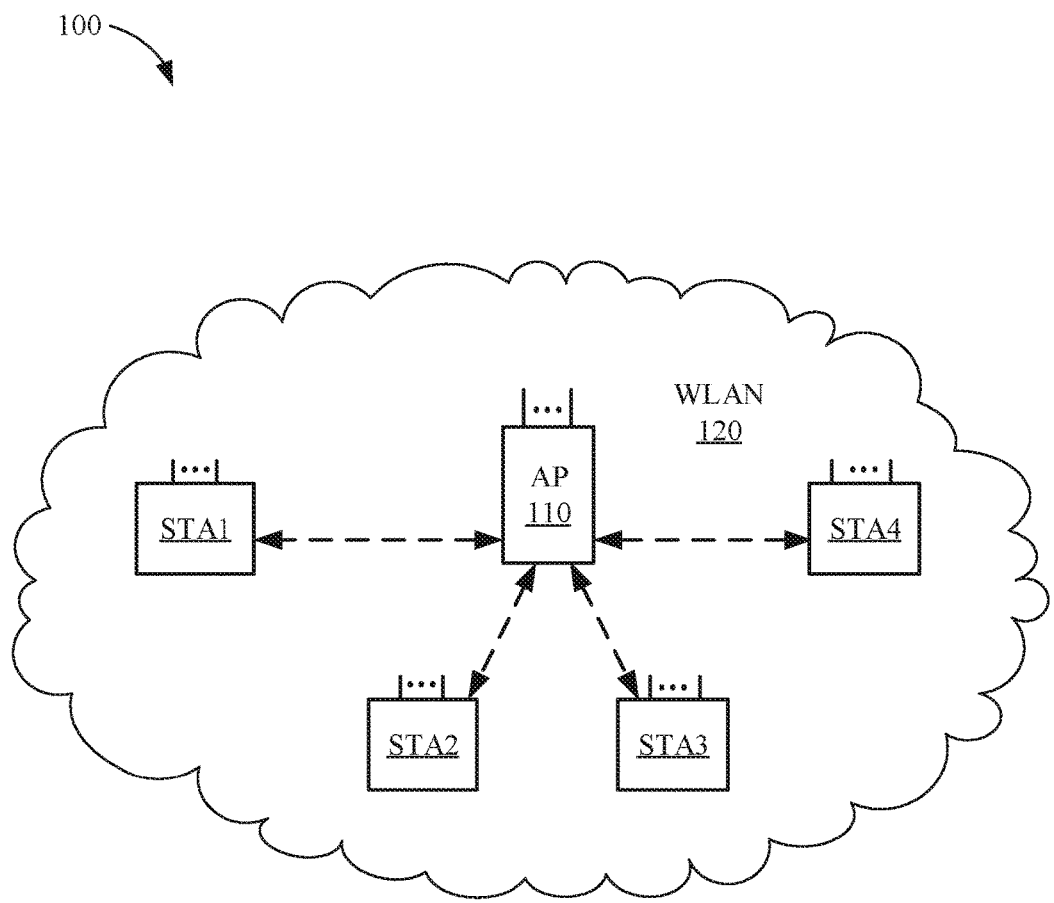
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Increases in the width (or duration) of OFDM symbols caused by filter delays in a transmitting device, filter delays in a receiving device, and multipath effects of a wireless channel may be referred to as channel delay spread (CDS). To minimize inter-symbol interference (ISI) resulting from CDS, a guard interval may be provided between OFDM symbols. The IEEE 802.11a/g/n/ac standards allow two guard intervals (GIs) for OFDM transmissions: a default GI of 0.8 microseconds (μs) and a "short" GI of 0.4 μs. Because CDS values associated with an UL channel and a DL channel may not be readily available, wireless devices typically select the default GI of 0.8 μs to minimize ISI caused by CDS. Although longer guard intervals may reduce ISI resulting from CDS, longer guard intervals may reduce channel efficiency. Conversely, although shorter guard intervals may increase channel efficiency, shorter guard intervals may result in higher packet error rates.

The IEEE 802.11ax specification addresses outdoor wireless communications, which may have longer channel delay spreads than indoor wireless communications. These longer channel delay spreads may require longer guard intervals and longer OFDM symbol lengths (such as compared with the IEEE 802.11a/g/n/ac standards). For example, the IEEE 802.11ax specification may allow four guard intervals (GIs) for OFDM transmissions: a first GI of 3.2 μs, a second GI of 1.6 μs, and the 0.8 μs and 0.4 μs GIs defined in the IEEE 802.11a/g/n/ac standards. The CDS values associated with UL and DL channels may not be readily available, and therefore wireless devices typically select the longest GI to minimize ISI caused by CDS. Because the longest GI specified in the IEEE 802.11ax standards is four times as long as the longest GI specified in the IEEE 802.11a/g/n/ac standards, it is increasingly important to select a GI value that minimizes ISI caused by CDS while maximizing channel efficiency.

Implementations of the subject matter described in this disclosure may be used to a select a guard interval for transmission of OFDM symbols on an UL channel and on a DL channel. In some aspects, a transmitting device and a receiving device can estimate channel delay spread (CDS) information for each other's transmit channels, exchange the estimated CDS information with each other, and select a guard interval based on the estimated CDS information exchanged with each other. The transmitting device can transmit a number of OFDM symbols separated by the selected guard interval to the receiving device on the UL channel, and the receiving device can transmit a number of OFDM symbols separated by the selected guard interval to the transmitting device on the DL channel.

In some implementations, the CDS capabilities of the transmitting device can be provided to the receiving device in an FTM request frame. The FTM request frame can include a vendor-specific information element (VSIE) indicating the CDS capabilities of the transmitting device. In some aspects, the VSIE can include one or more dedicated bits indicating whether the transmitting device is capable of estimating CDS information for the DL channel and whether the transmitting device is capable of transmitting an FTM feedback frame to the receiving device. In other aspects, the VSIE can include a dedicated bit either indicating whether the transmitting device is capable of estimating CDS information for the DL channel or indicating whether the transmitting device is capable of transmitting an FTM feedback frame to the receiving device.

The CDS capabilities of the receiving device can be provided to the transmitting device in an FTM frame. The FTM frame can include a VSIE indicating the CDS capabilities of the receiving device. In some aspects, the VSIE can include one or more dedicated bits indicating whether the receiving device is capable of estimating CDS information for the UL channel and whether the receiving device is to report estimated CDS information for the UL channel to the transmitting device. In other aspects, the VSIE can include a dedicated bit either indicating whether the receiving device is capable of estimating CDS information for the UL channel or indicating whether the receiving device is to report estimated CDS information for the UL channel to the transmitting device.

Particular implementations of the subject matter described in this disclosure can be implemented to realize one or more of the following potential advantages. Because the transmitting device can estimate the CDS of the DL channel and provide the estimated CDS value to the receiving device, the receiving device can select a guard interval for transmitting OFDM symbols on the DL channel based on the estimated CDS of the DL channel. Similarly, because the receiving device can estimate the CDS of the UL channel and provide the estimated CDS value to the transmitting device, the transmitting device can select a guard interval for transmitting OFDM symbols on the UL channel based on the estimated CDS of the UL channel. In this manner, aspects of the present disclosure may allow the transmitting device and the receiving device to select guard intervals that minimize ISI caused by CDS while maximizing channel efficiency.

FIG. 1 shows a block diagram of an example wireless system 100. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that the WLAN 120 may be formed by any number of access points such as the AP 110. The AP 110 is assigned a unique media access control (MAC) address that is programmed therein by, for example, the manufacturer of the access point. Similarly, each of the stations STA1-STA4 is also assigned a unique MAC address. In some implementations, the wireless system 100 may correspond to a multiple-input multiple-output (MIMO) wireless network, and may support single-user MIMO (SU-MIMO) and multi-user (MU-MIMO) communications. Further, although the WLAN 120 is depicted in FIG. 1 as an infrastructure BSS, in some other implementations, the WLAN 120 may be an IBSS, an ad-hoc network, or a peer-to-peer (P2P) network (such as operating according to the Wi-Fi Direct protocols).

Each of the stations STA1-STA4 may be any suitable Wi-Fi enabled wireless device including, for example, a cell phone, personal digital assistant (PDA), tablet device, laptop computer, or the like. Each of the stations STA1-STA4 also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources (such as processors, ASICs, or a combination of both), one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIGS. 5A-5B and FIGS. 8-9.

The AP 110 may be any suitable device that allows one or more wireless devices to connect to a network (such as a local area network (LAN), wide area network (WAN), metropolitan area network (MAN), and the Internet) via the AP 110 using Wi-Fi, Bluetooth, or any other suitable wireless communication standards. In some implementations, the AP 110 may include one or more transceivers, one or more processing resources (such as processors, ASICs, or a combination of both), one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below with respect to FIGS. 5A-5B and FIGS. 8-9.

Figure 2:
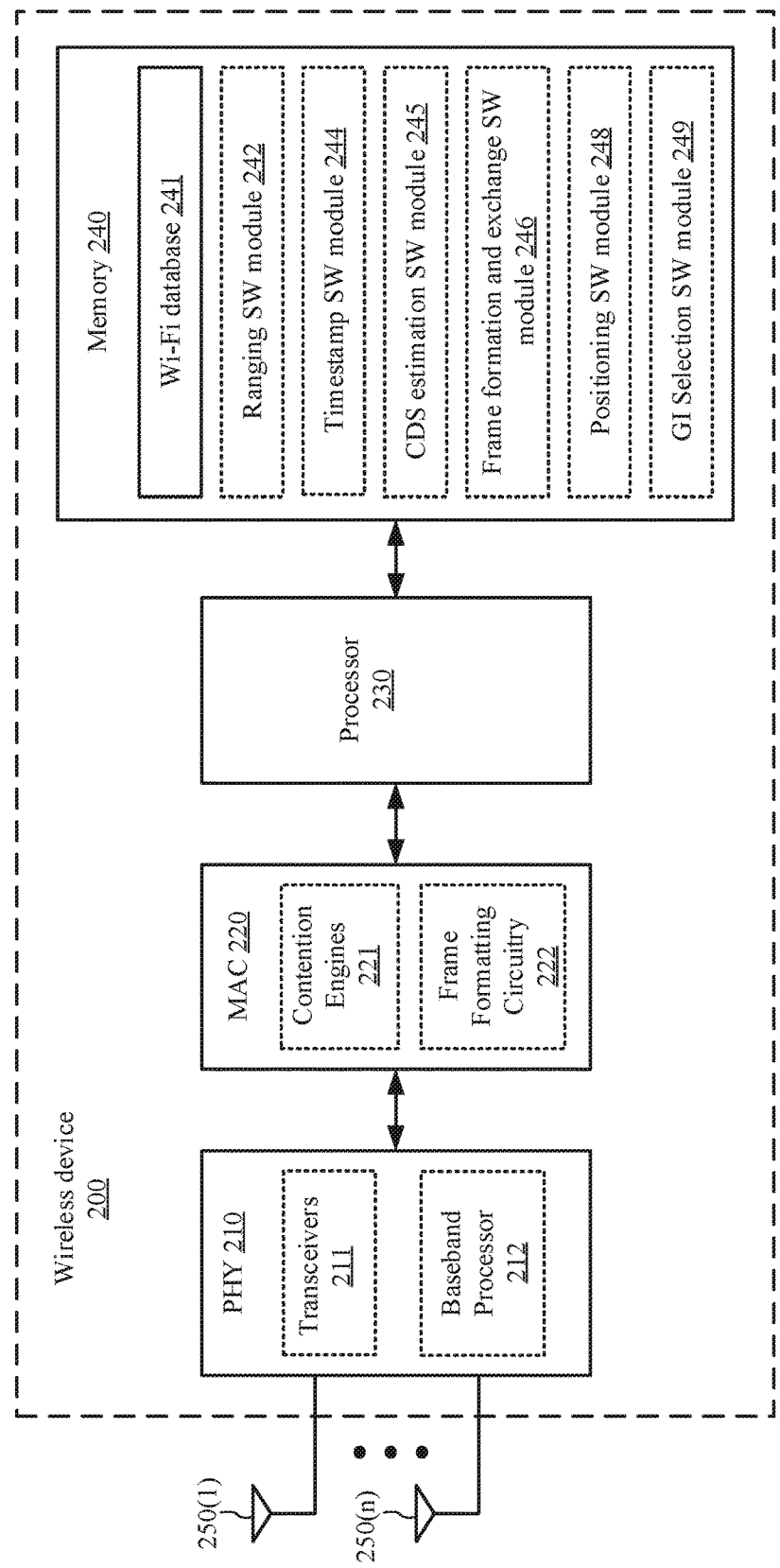
FIG. 2 shows a block diagram of an example wireless device.

FIG. 2 shows a block diagram of an example wireless device 200. The example wireless device 200 may be one implementation of the stations STA1-STA4 and the AP 110 of FIG. 1. The wireless device 200 may include a physical-layer device (PHY) 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to the antennas 250(1)-250(n), either directly or through an antenna selection circuit (not shown for simplicity). The transceivers 211 may be used to transmit signals to and receive signals from other suitable wireless devices, and may be used to scan the surrounding environment to detect and identify nearby access points and other wireless devices (such as within wireless range of wireless device 200). Although not shown in FIG. 2 for simplicity, the transceivers 211 may include any number of transmit chains to process and transmit signals to other wireless devices via the antennas 250(1)-250(n), and may include any number of receive chains to process signals received from the antennas 250(1)-250(n). In some implementations, the wireless device 200 may be configured for MIMO operations. The MIMO operations may include SU-MIMO operations and MU-MIMO operations.

The baseband processor 212 may be used to process signals received from the processor 230 and the memory 240 and to forward the processed signals to the transceivers 211 for transmission via one or more of the antennas 250(1)-250(n), and may be used to process signals received from one or more of the antennas 250(1)-250(n) via the transceivers 211 and to forward the processed signals to the processor 230 and the memory 240.

The contention engines 221 may contend for access to one or more shared wireless mediums, and also may store packets for transmission over the one or more shared wireless mediums. In some other implementations, the contention engines 221 may be separate from the MAC 220. For still other implementations, the contention engines 221 may be implemented as one or more software modules (such as stored in the memory 240 or stored in memory provided within the MAC 220) containing instructions that, when executed by the processor 230, perform the functions of the contention engines 221.

The frame formatting circuitry 222 may be used to create and format frames received from the processor 230 and the memory 240 (such as by adding MAC headers to PDUs provided by the processor 230), and may be used to re-format frames received from the PHY 210 (such as by stripping MAC headers from frames received from the PHY 210).

The memory 240 may include a Wi-Fi database 241 that may store location data, configuration information, data rates, MAC addresses, and other suitable information about (or pertaining to) a number of access points, stations, and other wireless devices. The Wi-Fi database 241 also may store profile information for a number of wireless devices. The profile information for a given wireless device may include information including, for example, the wireless device's service set identification (SSID), channel information, received signal strength indicator (RSSI) values, goodput values, channel state information (CSI), and connection history with wireless device 200.

The memory 240 also may include a non-transitory computer-readable medium (such as one or more nonvolatile memory elements, such as EPROM, EEPROM, Flash memory, a hard drive, and so on) that may store the following software (SW) modules:

- a ranging SW module 242 to determine RTT values and to estimate the distance between the wireless device 200 and one or more other devices, for example, as described below for one or more operations of FIGS. 5A-5B and FIGS. 8-9;
- a timestamp SW module 244 to capture or record timestamps of signals received by the wireless device 200 (such as TOA information) and to capture or record timestamps of signals transmitted from the wireless device 200 (such as TOD information), for example, as described below for one or more operations of FIGS. 5A-5B and FIGS. 8-9
- a channel delay spread (CDS) estimation SW module 245 to estimate the channel delay spread associated with packets received from other wireless devices and to decode channel delay spread information provided by one or more other wireless devices, for example, as described below for one or more operations of FIGS. 5A-5B and FIGS. 8-9;
- a frame formation and exchange SW module 246 to create, transmit, and receive frames to and from other wireless devices, to embed capabilities of the wireless device 200 (such as a capability to estimate CDS and a capability to provide feedback during ranging operations) into frames transmitted to other wireless devices, and to decode the capabilities of other wireless devices, for example, as described below for one or more operations of FIGS. 5A-5B and FIGS. 8-9;
- a positioning SW module 248 to determine the location of the wireless device 200 based, at least in part, on the distances determined by the ranging SW module 242, for example, as described below for one or more operations of FIGS. 5A-5B and FIGS. 8-9; and
- a guard interval (GI) selection SW module 249 to select a guard interval value that achieves an optimal balance between maximizing data rates on the wireless medium and minimizing inter-symbol interference (ISI) resulting from the effects of channel delay spread, for example, as described below for one or more operations of FIGS. 5A-5B and FIGS. 8-9.

Each software module includes instructions that, when executed by the processor 230, cause the wireless device 200 to perform the corresponding functions. The non-transitory computer-readable medium of the memory 240 thus includes instructions for performing all or a portion of the operations of FIGS. 5A-5B and FIGS. 8-9.

The processor 230 may execute the ranging SW module 242 to determine RTT values and to estimate the distance between the wireless device 200 and one or more other devices based on a number of ranging frames exchanged between wireless device 200 and the one or more other wireless devices.

The processor 230 may execute the timestamp SW module 244 to capture or record timestamps of signals received by the wireless device 200 (such as TOA information) and to capture or record timestamps of signals transmitted from the wireless device 200 (such as TOD information). More specifically, the timestamp SW module 244 may be executed to capture or record TOA information of FTM frames, TOA information of ACK frames, TOD information of FTM frames, and TOD information of ACK frames.

The processor 230 may execute the CDS estimation SW module 245 to estimate the channel delay spread associated with packets received from other wireless devices and to decode channel delay spread information provided by one or more other wireless devices.

The processor 230 may execute the frame formation and exchange SW module 246 to create, transmit, and receive frames to and from other wireless devices, to embed capabilities of the wireless device 200 (such as a capability to estimate CDS and a capability to provide feedback during ranging operations) into frames transmitted to other wireless devices, and to decode the capabilities of other wireless devices. The frames created, transmitted, and received by execution of the frame formation and exchange SW module 246 may be any suitable frames including, for example, action frames, control frames, management frames, and data frames. The management frames may include any suitable type of FTM frames (such as FTM request frames, FTM action frames, and FTM feedback frames), any suitable type of beacon frames, any suitable type of probe request and probe response frames, any suitable type of association request and association response frames, or/and any suitable type of ACK frames.

The processor 230 may execute the positioning SW module 248 to determine the location of the wireless device 200 based, at least in part, on the distances determined by the ranging SW module 242. For example, the positioning SW module 248 may be executed to determine the relative position of the wireless device 200 from the distances between the wireless device 200 and three other devices (such as using known trilateration techniques). If the locations of the three other devices are known, then the actual position of wireless device 200 may be determined.

The processor 230 may execute the guard interval (GI) selection SW module 249 to select a guard interval value that achieves an optimal balance between maximizing data rates on the wireless medium and minimizing inter-symbol interference (ISI) resulting from the effects of channel delay spread.

Figure 3:
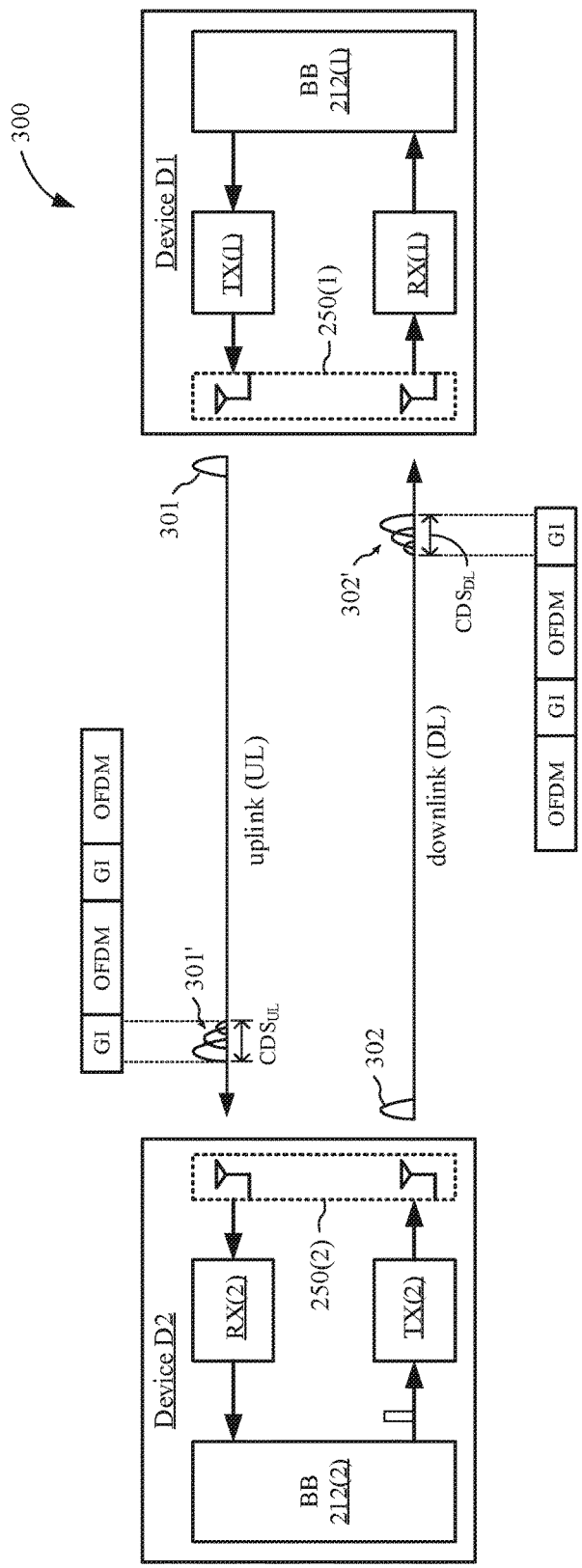
FIG. 3 shows a diagram depicting an example transmission of OFDM symbols between two wireless devices.

FIG. 3 shows a diagram 300 depicting an example transmission of OFDM symbols between two wireless devices. As shown in FIG. 3, packets are transmitted as OFDM symbols between a first wireless device (device D1) and a second wireless device (device D2). Device D1 and device D2 may each be one implementation of the wireless device 200 of FIG. 2. Device D1, which also may be referred to herein as the transmitting device, is shown to include a baseband (BB) processor 212(1), a number of antennas 250(1), a transmit chain including at least a transmit filter TX(1), and a receive chain including at least a receive filter RX(1). Device D2, which also may be referred to herein as the receiving device, is shown to include a BB processor 212(2), a number of antennas 250(2), a transmit chain including at least a transmit filter TX(2), and a receive chain including at least a receive filter RX(2). Device D1 may transmit an OFDM symbol 301 to device D2 on an uplink (UL) channel, and device D2 may transmit an OFDM symbol 302 to device D1 on a downlink (DL) channel.

When OFDM symbol 301 is transmitted from device D1, multipath effects and other imperfections in the UL channel may produce signal reflections or echoes that result in a channel delayed OFDM symbol 301' to appear at device D2. The increased width of the channel delayed OFDM symbol 301' is denoted as $CDS_{UL}$. Similarly, when OFDM symbol 302 is transmitted from device D2, multipath effects and other imperfections in the DL channel may produce signal reflections or echoes that result in a channel delayed OFDM symbol 302' to appear at device D1. The increased width of the channel delayed OFDM symbol 302' is denoted as $CDS_{DL}$.

Device D1 may minimize ISI caused by multipath effects and other imperfections in the UL channel by selecting a GI value that is greater than $CDS_{UL}$, and device D2 may minimize ISI caused by multipath effects and other imperfections in the DL channel by selecting a GI value that is greater than $CDS_{DL}$. For example, device D1 may estimate DL channel information based on packets received from device D2, estimate the CDS for the DL channel based on the estimated channel information, and then select a GI value based on the estimated CDS value for the DL channel Thereafter, device D1 may transmit OFDM symbols on the UL channel using the selected GI.

Because device D1 cannot estimate the CDS value for the UL channel, selecting a GI for UL transmissions based on estimated CDS values for the DL channel assumes that the UL and DL channels have the same CDS, which may not be accurate. In addition, the CDS associated with transmission of OFDM symbol 301 on the UL channel may depend not only on the delay characteristics of device D1's transmit filter TX(1) but also on the delay characteristics of device D2's receive filter RX(2). Because the transmit and receive filters of Wi-Fi devices are typically different, the delay characteristics of device D1's transmit filter TX(1) may be different than the delay characteristics of device D2's receive filter RX(2). In a similar manner, the CDS associated with transmission of OFDM symbol 302 on the DL channel may depend not only the delay characteristics of device D2's transmit filter TX(2) but also on the delay characteristics of device D1's receive filter RX(1).

Further, if OFDM symbol 301 is transmitted as a single spatial stream using multiple antennas, then device D1 may introduce cyclic shift diversity (CSD) between the transmit antennas, for example, to prevent beamforming. The cyclic shift diversity introduced by device D1 may appear as an additional channel delay to device D2, which may further reduce the accuracy of using a CDS estimate of the UL channel as a basis for selecting a GI for DL transmissions.

In some implementations, wireless devices may use a ranging operation to estimate the CDS of each other's transmit channels and then exchange their respective CDS estimates. Each of the wireless devices may use the estimated CDS provided by the other wireless device to accurately select an optimum GI for data transmissions. In some aspects, a receiving device may provide its estimated CDS value for the UL channel to a transmitting device, which may allow the transmitting device to select a GI based on the CDS of the UL channel (such as rather than on the CDS of the DL channel). Similarly, the transmitting device may provide its estimated CDS value for the DL channel to the receiving device, which may allow the receiving device to select a GI based on the CDS of the DL channel (such as rather than on the CDS of the UL channel).

Figure 4:
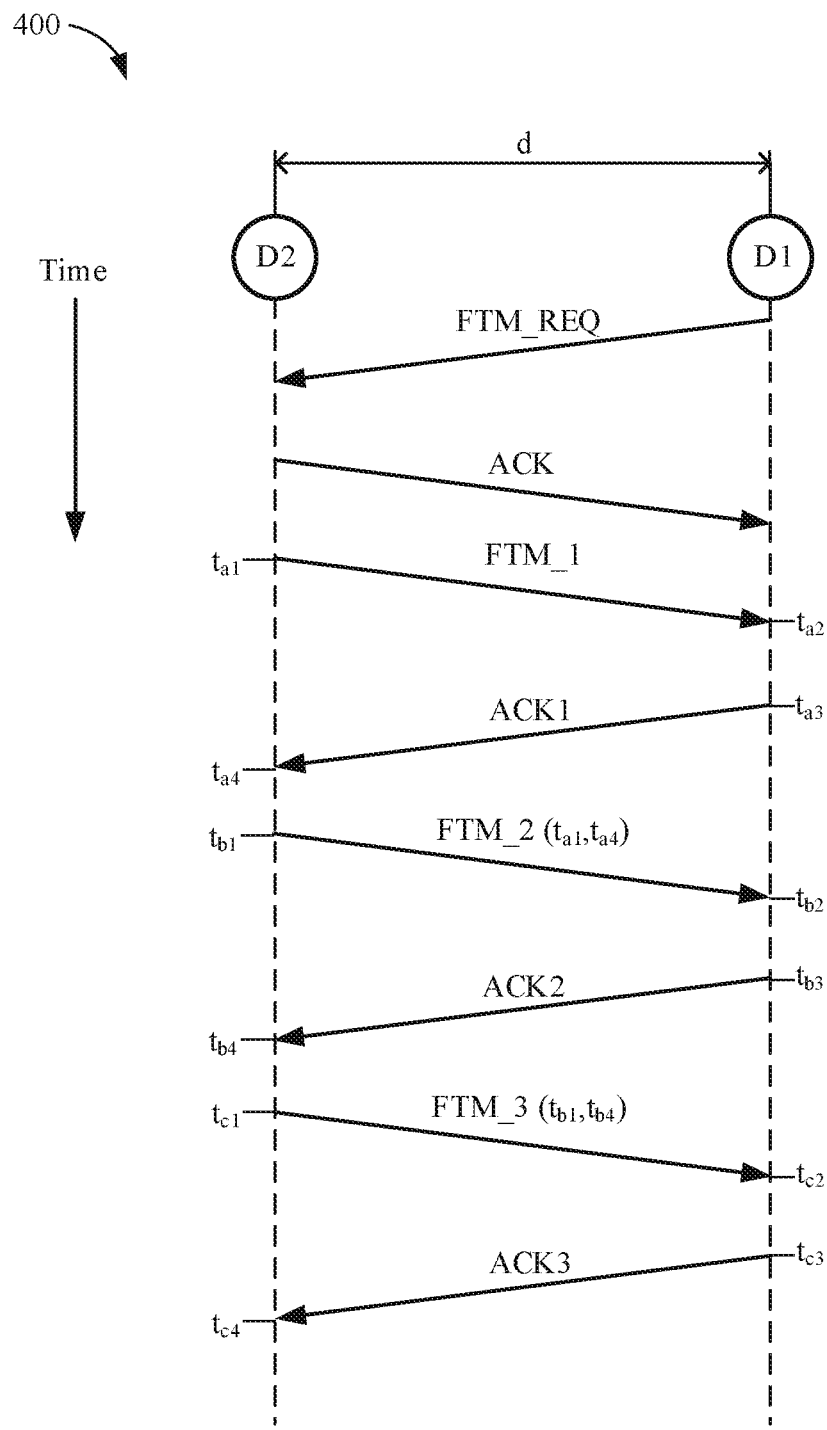
FIG. 4 shows a signal diagram of an example ranging operation.

FIG. 4 shows a signal diagram of an example ranging operation 400. The ranging operation 400 may be performed between device D1 and device D2 using Fine Timing Measurement (FTM) frames in accordance with the IEEE 802.11REVmc standards. Device D1 and device D2 may each be, for example, an access point (such as AP 110 of FIG. 1), a station (such as one of stations STA1-STA4 of FIG. 1), or other suitable wireless device (such as wireless device 200 of FIG. 2). For the example of FIG. 4, device D1 requests the ranging operation and may be referred to as initiator device (or the transmitting device). Device D2 responds to the request and may be referred to as the responder device (or the receiving device).

Device D1 may request or initiate the ranging operation by transmitting an FTM request (FTM_REQ) frame to device D2. The FTM_REQ frame also may include a request for device D2 to capture timestamps (such as TOA information of frames received by device D2 and TOD information of frames transmitted from device D2). Device D2 receives the FTM_REQ frame, and may acknowledge the requested ranging operation by transmitting an acknowledgement (ACK) frame to device D1. The ACK frame may indicate whether device D2 is capable of capturing the requested timestamps. It is noted that the exchange of the FTM_REQ frame and the ACK frame is a handshake process that not only signals an intent to perform a ranging operation but also allows devices D1 and D2 to determine whether each other supports capturing timestamps.

At time $t_{a1}$, device D2 transmits a first FTM (FTM_1) frame to device D1, and may record the TOD of the FTM_1 frame as time $t_{a1}$. Device D1 receives the FTM_1 frame at time $t_{a2}$, and may record the TOA of the FTM_1 frame as time $t_{a2}$. Device D1 responds by transmitting a first acknowledgement (ACK1) frame to device D2 at time $t_{a3}$, and may record the TOD of the ACK1 frame as time $t_{a3}$. Device D2 receives the ACK1 frame at time $t_{a4}$, and may record the TOA of the ACK1 frame at time $t_{a4}$. At time $t_{b1}$, device D2 transmits to device D1 a second FTM (FTM_2) frame that includes the timestamps captured at times $t_{a1}$ and $t_{a4}$ (such as the TOD of the FTM_1 frame and the TOA of the ACK1 frame). Device D1 receives the FTM_2 frame at time $t_{b2}$, and may record its timestamp as time $t_{b2}$.

Upon receiving the FTM_2 frame at time $t_{b2}$, device D1 has timestamp values for times $t_{a1}$, $t_{a2}$, $t_{a3}$, and $t_{a4}$ that correspond to the TOD of the FTM_1 frame transmitted from device D2, the TOA of the FTM_1 frame at device D1, the TOD of the ACK1 frame transmitted from device D1, and the TOA of the ACK1 frame at device D2, respectively. Thereafter, device D1 may determine a first RTT value as $RTT_1=(t_{a4}-t_{a3})+(t_{a2}-t_{a1})$. Because the value of $RTT_1$ does not involve estimating a short interframe space (SIFS) duration for either device D1 or device D2, the value of $RTT_1$ does not involve errors resulting from uncertainties of SIFS durations. Thereafter, device D1 may determine the distance (d) between device D1 and device D2 using the expression d=c*RTT/2, where c is the speed of light.

As depicted in FIG. 4, devices D1 and D2 are shown to exchange an additional pair of FTM and ACK frames from which an additional RTT value may be determined. Specifically, at time $t_{b3}$, device D1 may transmit a second acknowledgement (ACK2) frame to device D2 (such as to acknowledge reception of the FTM_2 frame). Device D2 receives the ACK2 frame at time $t_{b4}$, and may record the TOA of the ACK2 frame as time $t_{b4}$. At time $t_{c1}$, device D2 transmits to device D1 a third FTM (FTM_3) frame that includes the timestamps captured at times $t_{b1}$ and $t_{b4}$ (such as the TOD of the FTM_2 frame and the TOA of the ACK2 frame). Device D1 receives the FTM_3 frame at time $t_{c2}$, and may record its timestamp as time $t_{c2}$. Device D1 may respond by transmitting a third FTM acknowledgement (ACK3) frame to device D2 at time $t_{c3}$.

Upon receiving the FTM_3 frame at time $t_{c2}$, device D1 has timestamp values for times $t_{b1}$, $t_{b2}$, $t_{b3}$, and $t_{b4}$ that correspond to the TOD of the FTM_2 frame transmitted from device D2, the TOA of the FTM_2 frame at device D1, the TOD of the ACK2 frame transmitted from device D1, and the TOA of the ACK2 frame at device D2, respectively. Thereafter, device D1 may determine a second RTT value as $RTT_2=(t_{b4}-t_{b3})+(t_{b2}-t_{b1})$. This process may continue for any number of subsequent FTM and ACK frame exchanges between devices D1 and D2, for example, where device D2 embeds the timestamps of a given FTM and ACK frame exchange into a subsequent FTM frame transmitted to device D1. By determining multiple RTT values between devices D1 and D2, ranging accuracy may be improved by using the multiple RTT values to average out noise and to eliminate outlier RTT values (such as RTT values that are more than a given deviation from an average RTT value between devices D1 and D2).

The example ranging operation 400 of FIG. 4 may be modified to allow device D1 to estimate the CDS of the DL channel (denoted herein as $CDS_{DL}$) and provide the estimated $CDS_{DL}$ to device D2, and also may allow device D2 to estimate the CDS of the UL channel (denoted herein as $CDS_{DL}$) and provide the estimated $CDS_{DL}$ to device D1. In this manner, device D1 may select an optimum GI value for UL transmissions that is based on CDS estimates of the UL channel, and device D2 may select an optimum GI value for DL transmissions that is based on CDS estimates of the DL channel.

Figure 5A:
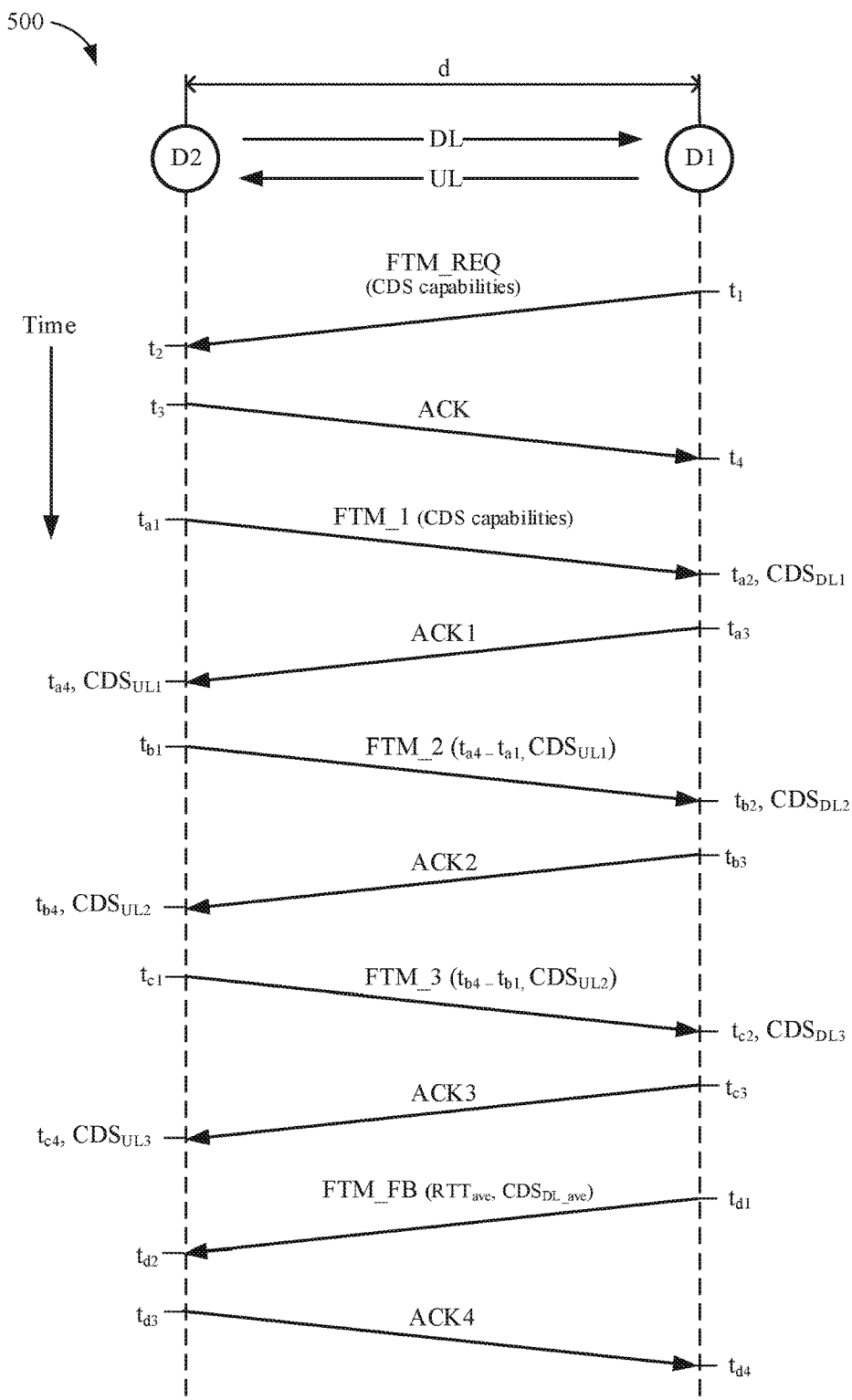
FIG. 5A shows a signal diagram of another example ranging operation.
Figure 5B:
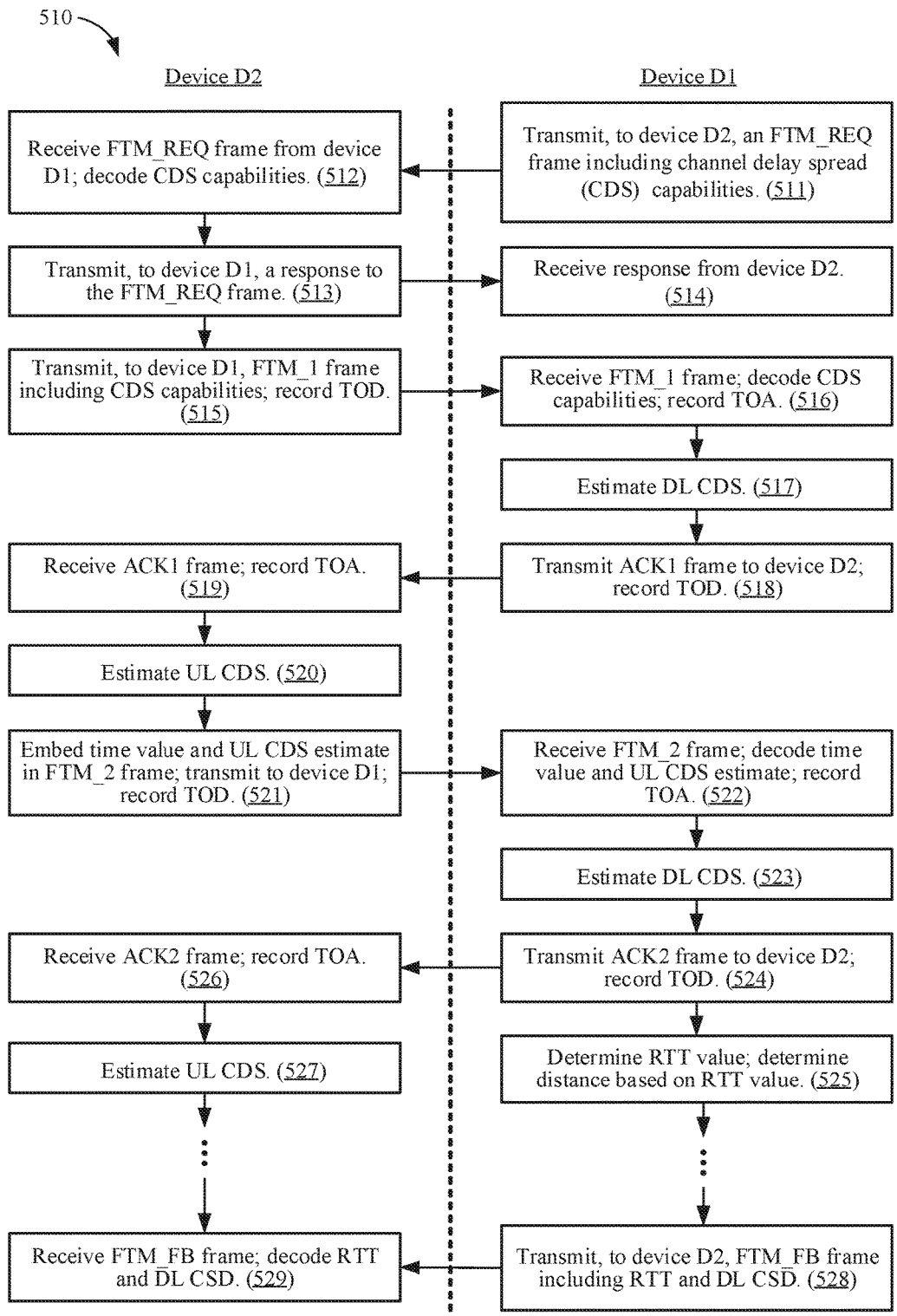
FIG. 5B shows a sequence diagram depicting the example ranging operation of FIG. 5A.

FIG. 5A shows a signal diagram of another example ranging operation 500, and FIG. 5B shows a sequence diagram 510 depicting the example ranging operation 500 of FIG. 5A. The example ranging operation 500 may allow devices D1 and D2 to exchange $CDS_{DL}$ and $CDS_{DL}$ information, in accordance with aspects of the present disclosure. Devices D1 and D2 may each be, for example, an access point (such as the AP 110 of FIG. 1), a station (such as one of the stations STA1-STA4 of FIG. 1), or another suitable wireless device (such as the wireless device 200 of FIG. 2). Referring also to FIG. 3, device D1 transmits signals to device D2 on the UL channel, and device D2 transmits signals to device D1 on the DL channel Device D1 may be the transmitting device, and device D2 may be the receiving device.

At time $t_1$, device D1 may request the ranging operation 500 by transmitting, to device D2, an FTM_REQ frame that includes channel delay spread (CDS) capabilities of device D1 (511). The CDS capabilities may indicate whether device D1 is capable of estimating CDS values based on packets received from device D2 on the DL channel, and may indicate whether device D1 is capable of transmitting (to device D2) a feedback frame that includes the estimated CDS values (and other information such as, for example, RTT information). The FTM_REQ frame also may request device D2 to capture or record timestamps, for example, in a manner similar to that described with respect to FIG. 4.

The CDS capabilities of device D1 may be included in or transmitted with the FTM_REQ frame in any suitable manner. In some implementations, the FTM_REQ frame may include a vendor-specific information element (VSIE) that indicates the CDS capabilities of device D1. The VSIE may be embedded within or appended to the FTM_REQ frame in any suitable manner. In some aspects, the VSIE may include a first dedicated bit to indicate whether device D1 is capable of estimating CDS information based on FTM frames received from device D2, and may include a second dedicated bit to indicate whether device D1 is capable of transmitting the aforementioned feedback frame (such as that includes estimated CDS values and RTT information) to device D2. For example, the first dedicated bit may be set to a value of "1" to indicate that device D1 is capable of estimating CDS information, or may be set to a value of "0" to indicate that device D1 is not capable of estimating CDS information. Similarly, the second dedicated bit may be set to a value of "1" to indicate that device D1 is capable of transmitting feedback frames, or may be set to a value of "0" to indicate that device D1 is not capable of transmitting feedback frames.

In some other aspects, the VSIE may include one dedicated bit either to indicate whether device D1 is capable of estimating CDS information for the DL channel based on FTM frames received from device D2 or to indicate whether device D1 is capable of transmitting the FTM_FB frame to device D2.

In some implementations, one of the reserved bits in an information element (IE) of the FTM_REQ frame may be used to indicate whether device D1 is capable of estimating CDS information based on FTM frames received from device D2 (such as where a value of "1" may indicate that device D1 is capable of estimating CDS information, and a value of "0" may indicate that device D1 is not capable of estimating CDS information), and another one of the reserved bits in the IE of the FTM_REQ frame may be used to indicate whether device D1 is capable of transmitting feedback frames (such as where a value of "1" may indicate that device D1 is capable of transmitting feedback frames, and a value of "0" may indicate that device D1 is not capable of transmitting feedback frames).

In some other implementations, device D1 and device D2 may exchange CDS capability information prior to the example ranging operation 500. For example, if device D1 (or device D2) is an access point or a group owner (GO), then device D1 (or device D2) may embed or append a CDS capabilities IE in beacon frames, for example, so that other wireless devices within wireless range are aware of the CDS capabilities of device D1 (or device D2). For another example, if device D1 (or device D2) is a station, then device D1 (or device D2) may embed or append a CDS capability IE in a probe request or an association request (or any other suitable frame), for example, to announce its CDS capabilities.

At time $t_2$, device D2 receives the FTM_REQ frame, and may decode the CDS capabilities of device D1 (512). Device D2 may acknowledge the requested ranging operation 500 by transmitting an ACK frame to device D1 at time $t_3$ (513). In some aspects, the ACK frame may indicate whether device D2 is capable of estimating CDS information based on packets received from device D1. Device D1 receives the ACK frame at time $t_4$, and may prepare for one or more FTM frame exchanges (514).

At time $t_{a1}$, device D2 transmits, to device D1, an FTM_1 frame that includes its CDS capabilities, and may record the TOD of the FTM_1 frame as time $t_{a1}$ (515). The CDS capabilities of device D2 may be included in or transmitted with the FTM_1 frame in any suitable manner. In some aspects, the FTM_1 frame may include a VSIE that indicates the CDS capabilities of device D1. The VSIE, which may be embedded within or appended to the FTM_1 frame in any suitable manner, may include a dedicated bit to indicate whether device D2 is capable of (and intends to) embed estimated CDS information in subsequent FTM frames. For example, device D2 may set the dedicated bit to a value of "1" to indicate that device D2 will embed CDS information in subsequent FTM frames, or may set the dedicated bit to a value of "0" to indicate that device D2 will not embed CDS information in subsequent FTM frames. In some other aspects, device D2 may not embed the VSIE into the FTM_1 frame, for example, to inform device D1 that device D2 will not embed CDS information in subsequent FTM frames (thereby reducing the size of the FTM_1 frame).

At time $t_{a2}$, device D1 receives the FTM_1 frame, may decode the CDS capabilities of device D2 (if provided in the FTM_1 frame), and may record the TOA of the FTM_1 frame as time $t_{a2}$ (516). Device D1 may obtain DL channel information based on the FTM_1 frame received from device D2, and then use the channel information to estimate a first CDS value for the DL channel ($CDS_{DL1}$) (517). At time $t_{a3}$, device D1 may transmit an ACK1 frame to device D2 and record the TOD of the ACK1 frame as time $t_{a3}$ (518).

Device D2 receives the ACK1 frame at time $t_{a4}$, and may record the TOA of the ACK1 frame as time $t_{a4}$ (519). Device D2 may obtain UL channel information based on the ACK1 frame received from device D1, and then use the channel information to estimate a first CDS value for the UL channel ($CDS_{UL1}$) (520).

Then, at time $t_{b1}$, device D2 may embed timing information, the estimated value of $CDS_{UL1}$, or both into an FTM_2 frame, transmit the FTM_2 frame to device D1, and record the TOD of the FTM_2 frame as time $t_{b1}$ (521). In some aspects, the timing information may indicate a difference between times $t_{a4}$ and $t_{a1}$ (such as $t_{diff}=t_{a4}-t_{a1}$), for example, as depicted in FIG. 5A. In some other aspects, the timing information may include timestamps $t_{a1}$ and $t_{a4}$ that correspond to the TOD of the FTM_1 frame transmitted from device D2 and the TOA of the ACK1 frame received at device D2, respectively.

At time $t_{b2}$, device D1 receives the FTM_2 frame, decodes the embedded timing information and the value of $CDS_{UL1}$, and records the TOA of the FTM_2 frame as time $t_{b2}$ (522). Device D1 may obtain DL channel information based on the FTM_2 frame received from device D2, and then use the channel information to estimate a second CDS value for the DL channel ($CDS_{DL2}$) (523). At time $t_{b3}$, device D1 may transmit an ACK2 frame to device D2 and record the TOD of the ACK2 frame as time $t_{b3}$ (524).

Upon receiving the FTM_2 frame at time $t_{b2}$, device D1 has timing information from which a first RTT value between device D1 and device D2 may be determined. In some aspects, device D1 may determine the first RTT value, and may determine the distance between devices D1 and D2 based on the first RTT value (525). For the example depicted in FIG. 5A, device D1 has timestamp values for times $t_{a2}$ and $t_{a3}$ that correspond to the TOA of the FTM_1 frame at device D1 and the TOD of the ACK1 frame transmitted from device D1, and has a difference value $t_{diff}$ indicative of the difference in time between the TOD of the FTM_1 frame transmitted from device D2 ($t_{a1}$) and the TOA of the ACK1 frame at device D2 ($t_{a4}$). Thereafter, device D1 may determine the first RTT value as $RTT_1=t_{diff}-(t_{a3}-t_{a2})$. In some other implementations in which device D2 embeds timestamp values $t_{a1}$ and $t_{a4}$ into the FTM_2 frame, device D1 may determine the first RTT value as $RTT_1=(t_{a4}-t_{a3})+(t_{a2}-t_{a1})$.

In addition, upon receiving the FTM_2 frame at time $t_{b2}$, device D1 has CDS information for the UL channel (such as $CDS_{UL1}$). In some implementations, device D1 may use the value of $CDS_{UL1}$ to select a GI value that achieves an optimal balance between minimizing ISI caused by channel delay spread and maximizing the efficiency of the UL channel Thus, for example, if the value of $CDS_{UL1}$ is between 3.2 μs and 1.6 μs, then device D1 may select the 3.2 μs GI specified by the IEEE 802.11ax standards.

For another example, if the value of $CDS_{UL1}$ is between 1.6 μs and 0.8 μs, then device D1 may select the 1.6 μs GI specified by the IEEE 802.11ax standards, and use the 1.6 μs GI for subsequent transmissions of OFDM symbols. In this example, the 1.6 μs GI is greater than the CDS of the UL channel (thereby minimizing ISI caused by CDS), and is one-half the duration of the longest GI of 3.2 μs. As a result, device D1 may be able to achieve higher data rates for OFDM symbol transmissions on the UL channel, for example, as compared to OFDM symbol transmissions using the longest GI of 3.2 μs.

For another example, if the value of $CDS_{UL1}$ is between 0.8 μs and 0.4 μs, then device D1 may select the 0.8 μs GI specified by the IEEE 802.11ax standards, and use the 0.8 μs GI for subsequent transmissions of OFDM symbols. In this example, the 0.8 μs GI is greater than the CDS of the UL channel (thereby minimizing ISI caused by CDS), and is one-fourth the duration of the longest GI of 3.2 μs. As a result, device D1 may be able to achieve higher data rates for OFDM symbol transmissions on the UL channel, for example, as compared to OFDM symbol transmissions using the 1.6 μs GI.

For yet another example, if the value of $CDS_{UL1}$ is less than 0.4 μs, then device D1 may select the 0.4 μs GI specified by the IEEE 802.11ax standards, and use the 0.4 μs GI for subsequent transmissions of OFDM symbols. In this example, the 0.4 μs GI is greater than the CDS of the UL channel (thereby minimizing ISI caused by CDS), and is one-eighth the duration of the longest GI of 3.2 μs. As a result, device D1 may be able to achieve higher data rates for OFDM symbol transmissions on the UL channel, for example, as compared to OFDM symbol transmissions using the 0.8 μs GI.

Because device D1 may select the GI value based on the estimated CDS of the UL channel (such as rather than assuming that the CDS of the UL channel is the same as the CDS of the DL channel), the GI selected by device D1 may be more accurately based on the actual channel conditions of the UL channel. As a result, device D1 may be able to maximize UL channel efficiency (by selecting a minimum GI value) while minimizing packet error rates (by selecting a GI value that is greater than the CDS of the UL channel).

Device D2 receives the ACK2 frame at time $t_{b4}$, and may record the TOA of the ACK2 frame as time $t_{b4}$ (526). Device D2 may obtain UL channel information based on the ACK2 frame received from device D1, and then use the channel information to estimate a second CDS value for the UL channel ($CDS_{UL2}$) (527).

This process may continue for any number of subsequent FTM and ACK frame exchanges, where each subsequent FTM and ACK frame exchange may allow device D2 to estimate another CDS value for the UL channel and may allow device D1 to estimate another CDS value for the DL channel and to determine another RTT value. For example, as depicted in FIG. 5A, devices D1 and D2 exchange a third set of FTM and ACK frames during the ranging operation 500.

More specifically, at time $t_{c1}$, device D2 may embed timing information, the value of $CDS_{UL2}$, or both into an FTM_3 frame, transmit the FTM_3 frame to device D1, and record the TOD of the FTM_3 frame as time $t_{c1}$. In some aspects, the timing information may include a difference value $t_{diff2}=t_{b4}-t_{b1}$, while in some other aspects, the timing information may include timestamps $t_{b1}$ and $t_{b4}$.

At time $t_{c2}$, device D1 receives the FTM_3 frame, decodes the embedded timing information and the value of $CDS_{UL2}$, and records the TOA of the FTM_3 frame as time $t_{c2}$. Device D1 may obtain DL channel information based on the FTM_3 frame received from device D2, and then use the channel information to estimate a third CDS value for the DL channel ($CDS_{DL3}$). At time $t_{c3}$, device D1 may transmit an ACK3 frame to device D2 and record the TOD of the ACK3 frame as time $t_{c3}$.

Upon receiving the FTM_3 frame at time $t_{c2}$, device D1 has timing information from which a second RTT value between device D1 and device D2 may be determined. In some aspects, device D1 may determine the second RTT value, and may determine the distance between devices D1 and D2 based on the second RTT value. For the example depicted in FIG. 5A, device D1 has timestamp values for times $t_{b2}$ and $t_{b3}$ that correspond to the TOA of the FTM_2 frame at device D1 and the TOD of the ACK2 frame transmitted from device D1, and has a difference value $t_{diff2}$ indicative of the difference in time between the TOD of the FTM_2 frame transmitted from device D2 ($t_{b1}$) and the TOA of the ACK2 frame at device D2 ($t_{b4}$). Thereafter, device D1 may determine the second RTT value as $RTT_2=t_{diff2}-(t_{b3}-t_{b2})$. In some other implementations in which device D2 embeds timestamp values $t_{b1}$ and $t_{b4}$ into the FTM_3 frame, device D1 may determine the second RTT value as $RTT_1=(t_{b4}-t_{b3})+(t_{b2}-t_{b1})$.

In addition, upon receiving the FTM_3 frame at time $t_{c2}$, device D1 has additional CDS information for the UL channel (such as $CDS_{UL2}$). In some implementations, device D1 may determine an average CDS value for the UL channel based on $CDS_{UL1}$ and $CDS_{UL2}$, which in turn may provide a more accurate estimate the channel delay spread of the UL channel.

Thereafter, device D1 may transmit, to device D2, an FTM feedback frame (FTM_FB) that includes RTT information and CDS information for the DL channel, at time $t_{d1}$ (528). In some aspects, device D1 may determine an average DL CDS value ($CDS_{DL\_ave}$) based on one or more of the previously estimated DL CDS values (such as $CDS_{DL1}$, $CDS_{DL2}$, and $CDS_{DL3}$), may determine an average RTT value ($RTT_{ave}$) based on one or more of the previously estimated RTT values (such as $RTT_1$ and $RTT_2$), and may embed values for $CDS_{DL\_ave}$ and $RTT_{ave}$ into the FTM_FB frame. In some other aspects, instead of embedding the value $RTT_{ave}$ into the FTM_FB frame, device D1 may embed an average of the differences between times $t_{a3}-t_{a2}$, times $t_{b3}-t_{b2}$, times $t_{c3}-t_{c2}$, or any combination thereof into the FTM_FB frame, or alternatively may embed a selected one of the RTT values (such as one of $RTT_1$, $RTT_2$, and so on).

At time $t_{d2}$, device D2 may receive the FTM_FB frame, and decode the embedded RTT information and the CDS information for the DL channel (529). At time $t_{d3}$, device D2 may transmit an ACK4 frame to device D1. Device D1 may receive the ACK4 frame at time $t_{d4}$.

Upon receiving the FTM_FB frame at time $t_{d2}$, device D2 has CDS information for the DL channel (such as $CDS_{DL\_ave}$). In some implementations, device D2 may use the value of $CDS_{DL\_ave}$ to select a GI value that achieves an optimal balance between minimizing ISI caused by channel delay spread and maximizing the efficiency of the DL channel. In some aspects, device D2 may select a GI value based on the value of $CDS_{DL\_ave}$ in a manner similar to that described with respect to device D1 selecting a GI based on CDS information for the UL channel.

It is noted that because device D2 may select the GI value based on the estimated CDS of the DL channel (such as rather than assuming that the CDS of the DL channel is the same as the CDS of the UL channel), the GI selected by device D2 may be more accurately based on the actual channel conditions of the DL channel. As a result, device D2 may be able to maximize DL channel efficiency (by selecting a minimum GI value) while minimizing packet error rates (by selecting a GI value that is greater than the CDS of the DL channel).

Figures 6A, 6B:
FIG. 6A shows an example FTM request frame.
FIG. 6B shows an example FTM action frame.

FIG. 6A shows an example FTM_REQ frame 600. In some implementations, the FTM_REQ frame 600 may be used in the example ranging operation 500 of FIG. 5A. The FTM_REQ frame 600 may include a category field 601, a public action field 602, a trigger field 603, an optional location civic information (LCI) measurement request field 604, an optional location civic measurement request field 605, an optional FTM parameters field 606, and a CDS capabilities VSIE 607. The fields 601-606 of the FTM_REQ frame 600 are well-known, and therefore are not discussed in detail herein.

The CDS capabilities VSIE 607 may store CDS capabilities of the initiator device (such as device D1), for example, as described with respect to FIG. 5A. In some other implementations, the CDS capabilities VSIE 607 may be an information element (IE).

FIG. 6B shows an example FTM frame 610. In some implementations, the FTM frame 610 may be used as one or more of the FTM_1 frame, the FTM_2 frame, the FTM_3 frame, and the FTM_FB frame in the example ranging operation 500 of FIG. 5A. The FTM frame 610 may include a category field 611, a public action field 612, a dialog token field 613, a follow up dialog token field 614, a TOD field 615, a TOA field 616, a TOD error field 617, a TOA error field 618, an optional LCI report field 619, an optional location civic report field 620, an optional FTM parameters field 621, and a CDS capabilities VSIE 622. The fields 611-621 of the FTM frame 610 are well-known, and therefore are not discussed in detail herein.

In some implementations, the TOD field 615 may include 6 bytes, and the TOA field 616 may include 6 bytes (although in some other implementations, other field lengths may be used). The TOD field 615 is typically used by the responder device to report a TOD value (such as $t_{a1}$) to the initiator device, and the TOA field 616 is typically used by the responder device to report a TOA value (such as $t_{a4}$) to the initiator device. In some implementations, one of the TOD field 615 and TOA field 616 may be used to report the difference time value ($t_{diff}=t_{a4}-t_{a1}$) to the initiator device, and the other of the TOD field 615 and TOA field 616 may be used to report the UL CDS information (such as $CDS_{UL}$) to the initiator device. In some aspects, the 48 bits of the TOD field 615 may be used to store a value for $t_{diff}$, and the 48 bits of the TOA field 616 may be used to store a value for $CDS_{UL}$. In some other aspects, the 48 bits of the TOD field 615 may be used to store a value for $CDS_{UL}$, and the 48 bits of the TOA field 616 may be used to store a value for $t_{diff}$.

In some other implementations, the CDS values may be stored in the TOD error field 617 or in the TOA error field 618.

The CDS capabilities VSIE 622 may store CDS capabilities of the responder device (such as device D2), for example, as described with respect to FIG. 5A. In some other implementations, the CDS capabilities VSIE 622 may be an information element (IE).

FIG. 7 shows a CDS capabilities VSIE 700. The CDS capabilities VSIE 700 may include an Element ID field 701, a Length field 702, and a CDS information field 703. In some implementations, the Element ID field 701 may include one byte, the Length field 702 may include one byte, and the CDS information field 703 may include one byte (although in some other implementations, other field lengths may be used). The Element ID field 701 may store an element ID value indicating that VSIE 700 contains CDS capabilities for a device. The Length field 702 may store a value indicating a length (in bytes) of the CDS information field 703.

In some aspects, the 8 bits in the CDS information field 703 may store CDS values up to 2550 nanoseconds (ns) with a resolution of 10 ns. In this manner, the four guard intervals specified in the IEEE 802.11ax standards may be expressed as 400 ns, 800 ns, 1600 ns, and 3200 ns, respectively. If the channel delay spread is longer than 2550 ns, then the 8 bits in the CDS information field 703 may be set to indicate a value of 2550 ns. In response thereto, a receiving may select a GI value of 3200 (such as 3.2 μs).

In some other implementations, the CDS information field 703 may include 2 bits (such as rather than 8 bits) that may indicate up to four ranges of CDS values. For example, in some aspects, a value of "00" may indicate that the CDS value is less than 0.4 μs, a value of "01" may indicate that the CDS value is between 0.4 μs and 0.8 μs, a value of "10" may indicate that the CDS value is between 0.8 μs and 1.6 μs, and a value of "11" may indicate that the CDS value is between 1.6 μs and 3.2 μs or greater than 3.2 μs.

Figure 8:
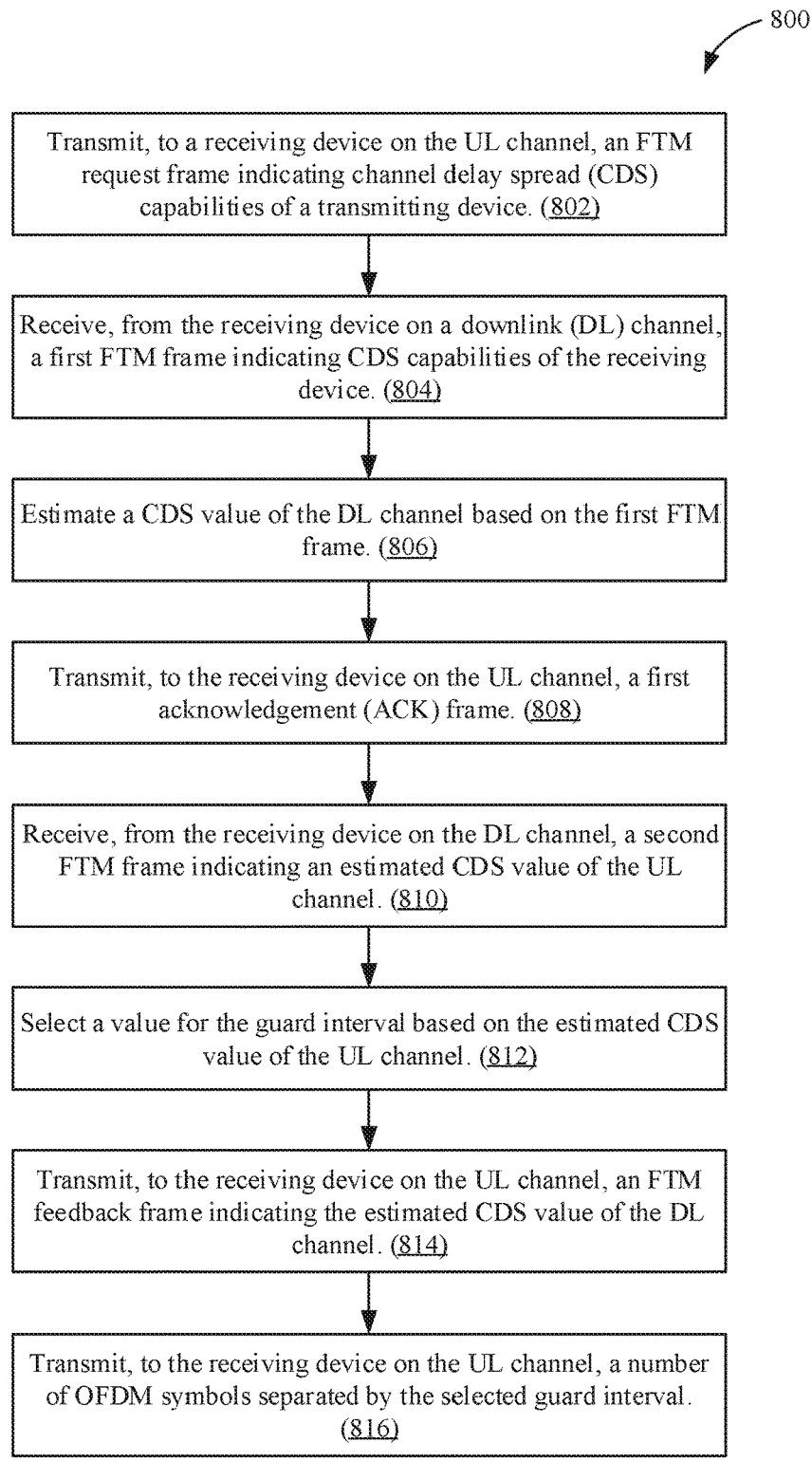
FIG. 8 shows an illustrative flow chart depicting an example operation for selecting a guard interval for uplink transmissions.

FIG. 8 shows an illustrative flow chart depicting an example operation 800 for selecting a guard interval for uplink transmissions. In some implementations, the example operation 800 may include the transmission of OFDM symbols from a transmitting device to a receiving device on an uplink (UL) channel. The transmitting device and the receiving device may be, for example, an access point (such as the AP 110 of FIG. 1), a station (such as one of the stations STA1-STA4 of FIG. 1), or any suitable wireless device (such as the wireless device 200 of FIG. 2).

The transmitting device transmits, to the receiving device on the UL channel, an FTM request frame indicating channel delay spread (CDS) capabilities of the transmitting device (802). The CDS capabilities may indicate whether the transmitting device is capable of estimating CDS values based on packets received from the receiving device on the DL channel and may indicate whether the transmitting device is capable of transmitting (to the receiving device) a feedback frame that includes the estimated CDS values and other information such as, for example, RTT information.

The transmitting device receives, from the receiving device on a downlink (DL) channel, a first FTM frame indicating CDS capabilities of the receiving device (804). The CDS capabilities of the receiving device may indicate whether the receiving device is capable of (and intends to) embed estimated CDS information in subsequent FTM frames.

The transmitting device estimates a CDS value of the DL channel based on reception of the first FTM frame (806). For example, the transmitting device may obtain DL channel information based on the FTM_1 frame received from the receiving device, and then use the channel information to estimate a first CDS value for the DL channel ($CDS_{DL1}$).

The transmitting device transmits, to the receiving device on the UL channel, a first acknowledgement (ACK) frame (808), and then receives, from the receiving device on the DL channel, a second FTM frame indicating an estimated CDS value of the UL channel (810). The transmitting device may then select a value for the guard interval based on the estimated CDS value of the UL channel (812). In some implementations, because the transmitting device may select the GI value based on the estimated CDS of the UL channel (such as rather than assuming that the CDS of the UL channel is the same as the CDS of the DL channel), the GI selected by the transmitting device may be more accurately based on the actual channel conditions of the UL channel.

The transmitting device transmits, to the receiving device on the UL channel, an FTM feedback frame indicating the estimated CDS value of the DL channel (814). The FTM feedback frame also may include RTT information determined by the transmitting device.

Thereafter, the transmitting device may transmit, to the receiving device on the UL channel, a number of OFDM symbols separated by the selected guard interval (816). In this manner, the transmitting device may minimize ISI caused by CDS while maximizing channel efficiency, for example, by selecting the shortest GI value that still exceeds the CDS value of the UL channel.

Figure 9:
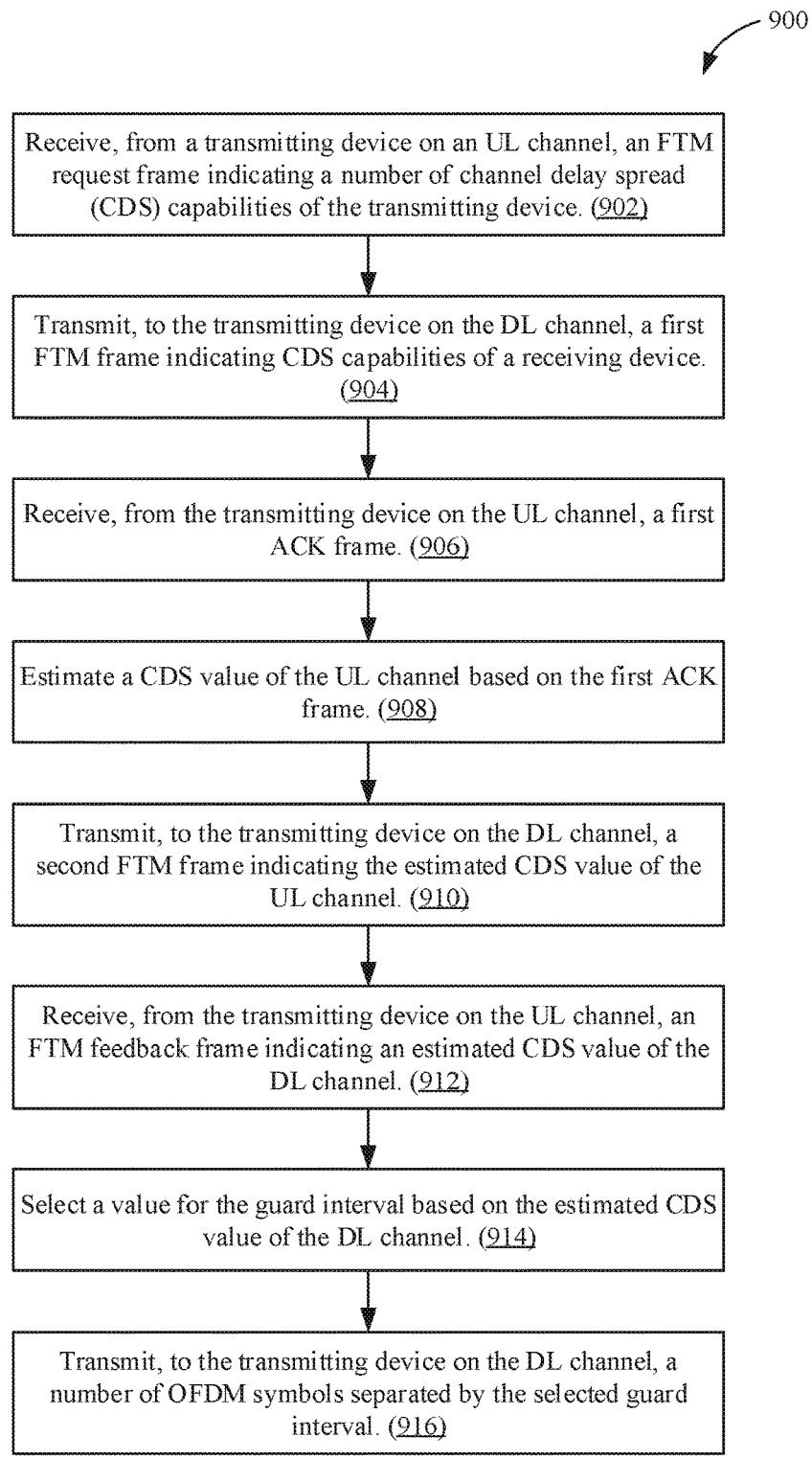
FIG. 9 shows an illustrative flow chart depicting an example operation for selecting a guard interval for downlink transmissions.

FIG. 9 shows an illustrative flow chart depicting an example operation 900 for selecting a guard interval for downlink transmission. In some implementations, the example operation 900 may include the transmission of OFDM symbols from the receiving device to the transmitting device on a downlink (DL) channel. The transmitting device and the receiving device may be, for example, an access point (such as the AP 110 of FIG. 1), a station (such as one of the stations STA1-STA4 of FIG. 1), or any suitable wireless device (such as the wireless device 200 of FIG. 2).

The receiving device receives, from the transmitting device on an UL channel, an FTM request frame indicating a number of channel delay spread (CDS) capabilities of the transmitting device (902). The CDS capabilities may indicate whether the transmitting device is capable of estimating CDS values based on packets received from the receiving device on the DL channel and may indicate whether the transmitting device is capable of transmitting (to the receiving device) a feedback frame that includes the estimated CDS values and other information such as, for example, RTT information.

The receiving device transmits, to the transmitting device on the DL channel, a first FTM frame indicating CDS capabilities of the receiving device (904). The CDS capabilities of the receiving device may indicate whether the receiving device is capable of (and intends to) embed estimated CDS information in subsequent FTM frames.

The receiving device receives, from the transmitting device on the UL channel, a first acknowledgement (ACK) frame (906), and may then estimate a CDS value of the UL channel based on reception of the first ACK frame (908). For example, the receiving device may obtain UL channel information based on the ACK1 frame received from the receiving device, and then use the channel information to estimate a first CDS value for the UL channel ($CDS_{UL1}$).

The receiving device transmits, to the transmitting device on the DL channel, a second FTM frame indicating the estimated CDS value of the UL channel (910). The second FTM frame also may include timing information from which the transmitting device may determine one or more RTT values. The receiving device then receives, from the transmitting device on the UL channel, an FTM feedback frame indicating an estimated CDS value of the DL channel (912).

In response thereto, the receiving device selects a value for the guard interval based on the estimated CDS value of the DL channel (914). In some implementations, because the receiving device may select the GI value based on the estimated CDS of the DL channel (such as rather than assuming that the CDS of the DL channel is the same as the CDS of the UL channel), the GI selected by the receiving device may be more accurately based on the actual channel conditions of the DL channel. As a result, the receiving device may be able to maximize DL channel efficiency while minimizing packet error rates.

Thereafter, the receiving device may transmit, to the transmitting device on the DL channel, a number of OFDM symbols separated by the selected guard interval (916). In this manner, the receiving device may minimize ISI caused by CDS while maximizing channel efficiency, for example, by selecting the shortest GI value that still exceeds the CDS value of the DL channel.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor, a plurality of microprocessors, one or more microprocessors in conjunction with a DSP core, or any other such configuration). In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of selecting a guard interval for transmission of orthogonal frequency-division multiplexing (OFDM) symbols on an uplink (UL) channel, comprising:
   transmitting, to a receiving device on the UL channel, a fine timing measurement (FTM) request frame indicating channel delay spread (CDS) capabilities of a transmitting device;
   receiving, from the receiving device on a downlink (DL) channel, a first FTM frame indicating CDS capabilities of the receiving device;
   estimating a CDS value of the DL channel based on the first FTM frame;
   transmitting, to the receiving device on the UL channel, a first acknowledgement (ACK) frame;
   receiving, from the receiving device on the DL channel, a second FTM frame indicating an estimated CDS value of the UL channel; and
   selecting a value for the guard interval based on the estimated CDS value of the UL channel.

2. The method of claim 1, wherein the FTM request frame includes a vendor-specific information element (VSIE) indicating the CDS capabilities of the transmitting device.

3. The method of claim 2, wherein the VSIE includes a dedicated bit indicating whether the transmitting device is capable of estimating CDS information for the DL channel or whether the transmitting device is capable of transmitting an FTM feedback frame to the receiving device.

4. The method of claim 1, wherein the first FTM frame includes a vendor-specific information element (VSIE) indicating the CDS capabilities of the receiving device.

5. The method of claim 4, wherein the VSIE includes a dedicated bit indicating whether the receiving device is capable of estimating CDS information for the UL channel or whether the receiving device is to report estimated CDS information for the UL channel to the transmitting device.

6. The method of claim 1, wherein the estimated CDS value of the UL channel is included in a first of a time of arrival (TOA) field of the second FTM frame and a time of departure (TOD) field of the second FTM frame, and a time value indicating a difference between the TOD of the first FTM frame and the TOA of the first ACK frame is included in a second of the TOA field of the second FTM frame and the TOD field of the second FTM frame.

7. The method of claim 1, wherein the estimated CDS value of the UL channel is included in a time of arrival (TOA) error field or a time of departure (TOD) error field of the second FTM frame.

8. The method of claim 1, further comprising:
transmitting, to the receiving device on the UL channel, an FTM feedback frame indicating the estimated CDS value of the DL channel.

9. The method of claim 1, further comprising:
transmitting, to the receiving device on the UL channel, a number of OFDM symbols separated by the selected guard interval.

10. An apparatus for selecting a guard interval for transmission of orthogonal frequency-division multiplexing (OFDM) symbols on an uplink (UL) channel, comprising:
one or more processors; and
a memory comprising instructions that, when executed by the one or more processors, causes the apparatus to:
transmit, to a receiving device on the UL channel, a fine timing measurement (FTM) request frame indicating channel delay spread (CDS) capabilities of the apparatus;
receive, from the receiving device on a downlink (DL) channel, a first FTM frame indicating CDS capabilities of the receiving device;
estimate a CDS value of the DL channel based on the first FTM frame;
transmit, to the receiving device on the UL channel, a first acknowledgement (ACK) frame;
receive, from the receiving device on the DL channel, a second FTM frame indicating an estimated CDS value of the UL channel; and
select a value for the guard interval based on the estimated CDS value of the UL channel.

11. The apparatus of claim 10, wherein the FTM request frame includes a vendor-specific information element (VSIE) indicating the CDS capabilities of the apparatus.

12. The apparatus of claim 10, wherein the first FTM frame includes a vendor-specific information element (VSIE) indicating the CDS capabilities of the receiving device.

13. The apparatus of claim 12, wherein the VSIE includes a dedicated bit indicating whether the receiving device is capable of estimating CDS information for the UL channel or whether the receiving device is to report estimated CDS information for the UL channel to the apparatus.

14. The apparatus of claim 10, wherein the estimated CDS value of the UL channel is included in a first of a time of arrival (TOA) field of the second FTM frame and a time of departure (TOD) field of the second FTM frame, and a time value indicating a difference between the TOD of the first FTM frame and the TOA of the first ACK frame is included in a second of the TOA field of the second FTM frame and the TOD field of the second FTM frame.

15. The apparatus of claim 10, wherein the estimated CDS value of the UL channel is included in a time of arrival (TOA) error field or a time of departure (TOD) error field of the second FTM frame.

16. The apparatus of claim 10, wherein execution of the instructions causes the apparatus to further:
transmit, to the receiving device on the UL channel, a number of OFDM symbols separated by the selected guard interval.

17. A method of selecting a guard interval for transmission of orthogonal frequency-division multiplexing (OFDM) symbols on a downlink (DL) channel, the method comprising:
receiving, from a transmitting device on an uplink (UL) channel, a fine timing measurement (FTM) request frame indicating a number of channel delay spread (CDS) capabilities of the transmitting device;
transmitting, to the transmitting device on the DL channel, a first FTM frame indicating CDS capabilities of the receiving device;
receiving, from the transmitting device on the UL channel, a first acknowledgement (ACK) frame;
estimating a CDS value of the UL channel based on the first ACK frame;
transmitting, to the transmitting device on the DL channel, a second FTM frame indicating the estimated CDS value of the UL channel;
receiving, from the transmitting device on the UL channel, an FTM feedback frame indicating an estimated CDS value of the DL channel; and
selecting a value for the guard interval based on the estimated CDS value of the DL channel.

18. The method of claim 17, wherein the FTM request frame includes a vendor-specific information element (VSIE) indicating the CDS capabilities of the transmitting device.

19. The method of claim 18, wherein the VSIE includes a dedicated bit indicating whether the transmitting device is capable of estimating CDS information for the DL channel or whether the transmitting device is capable of transmitting the FTM feedback frame to the receiving device.

20. The method of claim 17, wherein the first FTM frame includes a vendor-specific information element (VSIE) indicating the CDS capabilities of the receiving device.

21. The method of claim 20, wherein the VSIE includes a dedicated bit indicating whether the receiving device is capable of estimating CDS information for the UL channel or whether the receiving device is to report estimated CDS information for the UL channel to the transmitting device.

22. The method of claim 17, wherein the estimated CDS value of the UL channel is included in a first of a time of arrival (TOA) field of the second FTM frame and a time of departure (TOD) field of the second FTM frame, and a time value indicating a difference between the TOD of the first FTM frame and the TOA of the first ACK frame is included in a second of the TOA field of the second FTM frame and the TOD field of the second FTM frame.

23. The method of claim 17, wherein the estimated CDS value of the UL channel is included in a time of arrival (TOA) error field of the second FTM frame or in a time of departure (TOD) error field of the second FTM frame.

24. The method of claim 17, further comprising:
transmitting, to the transmitting device on the DL channel, a number of OFDM symbols separated by the selected guard interval.

25. An apparatus for selecting a guard interval for transmission of orthogonal frequency-division multiplexing (OFDM) symbols on a downlink (DL) channel, comprising:
one or more processors; and
a memory comprising instructions that, when executed by the one or more processors, causes the apparatus to:
receive, from a transmitting device on an uplink (UL) channel, a fine timing measurement (FTM) request frame indicating a number of channel delay spread (CDS) capabilities of the transmitting device;
transmit, to the transmitting device on the DL channel, a first FTM frame indicating CDS capabilities of the receiving device;
receive, from the transmitting device on the UL channel, a first acknowledgement (ACK) frame;
estimate a CDS value of the UL channel based on the first ACK frame;
transmit, to the transmitting device on the DL channel, a second FTM frame indicating the estimated CDS value of the UL channel;
receive, from the transmitting device on the UL channel, an FTM feedback frame indicating an estimated CDS value of the DL channel; and
select a value for the guard interval based on the estimated CDS value of the DL channel.

26. The apparatus of claim 25, wherein the FTM request frame includes a vendor-specific information element (VSIE) indicating the CDS capabilities of the transmitting device.

27. The apparatus of claim 25, wherein the first FTM frame includes a vendor-specific information element (VSIE) indicating the CDS capabilities of the receiving device.

28. The apparatus of claim 25, wherein the estimated CDS value of the UL channel is included in a first of a time of arrival (TOA) field of the second FTM frame and a time of departure (TOD) field of the second FTM frame, and a time value indicating a difference between the TOD of the first FTM frame and the TOA of the first ACK frame is included in a second of the TOA field of the second FTM frame and the TOD field of the second FTM frame.

29. The apparatus of claim 25, wherein the estimated CDS value of the UL channel is included in a time of arrival (TOA) error field of the second FTM frame or in a time of departure (TOD) error field of the second FTM frame.

30. The apparatus of claim 25, wherein execution of the instructions causes the apparatus to further:
transmit, to the transmitting device on the DL channel, a number of OFDM symbols separated by the selected guard interval.

* * * * *